US007933701B2

(12) United States Patent
Davis et al.

(10) Patent No.: US 7,933,701 B2
(45) Date of Patent: Apr. 26, 2011

(54) CLOSED-LOOP MOTION-CONTROL SYSTEM USING ERROR TO MODIFY GAIN

(75) Inventors: Robert Jay Davis, Aurora, IL (US); Michael Anthony Spielman, Brookfield, IL (US); Kevin Joseph Carew, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1153 days.

(21) Appl. No.: 11/646,456

(22) Filed: Dec. 28, 2006

(65) Prior Publication Data
US 2008/0161999 A1 Jul. 3, 2008

(51) Int. Cl.
A01B 69/00 (2006.01)
B62D 6/00 (2006.01)
B62D 11/00 (2006.01)
B62D 12/00 (2006.01)
B63G 8/20 (2006.01)
B63H 25/04 (2006.01)
G05D 1/00 (2006.01)
B60R 22/00 (2006.01)
E05F 15/00 (2006.01)
G05D 3/00 (2006.01)

(52) U.S. Cl. .......... 701/42; 701/1; 701/50; 701/60; 172/9; 172/75; 172/76; 172/663

(58) Field of Classification Search .............. 701/1, 42, 701/50, 60; 172/1, 2, 9, 74, 75, 76, 663; 180/237; 318/568.18, 616; 414/699
See application file for complete search history.

(56) References Cited

U.S. PATENT DOCUMENTS

| 3,906,196 | A | | 9/1975 | Spitz |
| 4,495,577 | A | | 1/1985 | Strunk et al. |
| 4,518,044 | A | | 5/1985 | Wiegardt et al. |
| 4,984,646 | A | | 1/1991 | Sano et al. |
| 5,040,119 | A | * | 8/1991 | Hardy et al. .......... 701/50 |
| 5,448,148 | A | | 9/1995 | Devier |
| 5,684,374 | A | * | 11/1997 | Chaffee .............. 318/616 |
| 5,884,204 | A | * | 3/1999 | Orbach et al. ........ 701/50 |
| 6,052,636 | A | | 4/2000 | Lombardi |
| 6,094,602 | A | | 7/2000 | Schade, III |

(Continued)

OTHER PUBLICATIONS

Kodagoda, K.R.S. et al., Fuzzy speed and steering control of an AGV; Control Systems Technology, IEEE Transactions on vol. 10, Issue: 1; 2002, pp. 112-120.*

(Continued)

Primary Examiner — Khoi Tran
Assistant Examiner — Jaime Figueroa
(74) Attorney, Agent, or Firm — Finnegan, Henderson, Farabow, Garrett & Dunner LLP

(57) ABSTRACT

A method of operating a motion-control system is provided. The motion-control system may include an actuator and a moveable component driven by the actuator. The method may include providing input that indicates a target value of a parameter of the motion of at least one of the actuator and the moveable component with an operator-input device that is mechanically decoupled from the moveable component. The method may also include controlling the operation of the actuator at least in part with a control signal, including generating the control signal at least in part by determining a control gain based at least in part on a control error between the target value of the parameter and an actual value of the parameter. Generating the control signal may also include multiplying the control gain by the control error or a value derived from the control error.

20 Claims, 4 Drawing Sheets

U.S. PATENT DOCUMENTS

| | | | |
|---|---|---|---|
| 6,115,660 A | 9/2000 | Berger et al. | |
| 6,140,787 A | 10/2000 | Lokhorst et al. | |
| 6,179,082 B1 | 1/2001 | Ikari | |
| 6,233,511 B1 | 5/2001 | Berger et al. | |
| 6,942,057 B2 | 9/2005 | Boloorchi et al. | |
| 7,099,760 B2* | 8/2006 | Lin et al. | 701/41 |
| 7,580,783 B2* | 8/2009 | Dix | 701/50 |
| 2002/0143451 A1* | 10/2002 | Hac et al. | 701/48 |
| 2003/0123581 A1 | 7/2003 | Kim | |
| 2005/0043874 A1* | 2/2005 | Chen et al. | 701/42 |
| 2005/0192734 A1 | 9/2005 | Yanakiev | |
| 2006/0020382 A1* | 1/2006 | Shin et al. | 701/42 |
| 2006/0089796 A1* | 4/2006 | Harrison et al. | 701/209 |
| 2007/0083299 A1* | 4/2007 | Lindores | 701/2 |
| 2007/0213902 A1* | 9/2007 | Shin et al. | 701/42 |
| 2008/0116000 A1* | 5/2008 | Huang et al. | 180/418 |

OTHER PUBLICATIONS

Davidson, P.R. et al.; Simulating closed- and open-loop voluntary movement: a nonlinear control-systems approach; Biomedical Engineering, IEEE Transactions on; vol. 49, Issue: 11; Jun. 4-6, 2003, pp. 1242-1252.*

Yih, P; Gerdes, J.C.; Modification of vehicle handling characteristics via steer-by-wire; Control Systems Technology, IEEE Transactions on; vol. 13, Issue: 6; 2005, pp. 965-976.*

Marino R. et al., Input-Output Decoupling Control by Measurement Feedback in Four-Wheel-Active-Steering Vehicles; Decision and Control, 2006 45th IEEE Conference on; 2006, pp. 1715-1720.*

* cited by examiner

CLOSED-LOOP MOTION-CONTROL SYSTEM USING ERROR TO MODIFY GAIN

TECHNICAL FIELD

The present disclosure relates to motion-control systems and, more particularly, to motion-control systems that control the motion of one or more moveable components in a closed-loop manner.

BACKGROUND

Many machines include motion-control systems that have one or more moveable components, and controls that regulate one or more aspects of the motion of the one or more moveable components. The controls of such a motion-control system may control a first operating parameter of the motion-control system to achieve a target value of a second operating parameter of the motion-control system. For example, first operating parameter, such as the steering direction of a vehicle may be controlled in accordance with a second operating parameter established by the position of a joystick.

Some motion-control systems control the first operating parameter in an open-loop manner, which entails controlling the first operating parameter in a manner estimated to achieve the target value of the second operating parameter without receiving information about the actual value of the second operating parameter. Such open-loop control strategies operate on the premise that the first operating parameter and the second operating parameter theoretically relate to one another in a known way and, accordingly, the motion-control system can theoretically control the second operating parameter in a predictable manner by controlling the first operating parameter. Unfortunately, various factors may cause the actual relationship between the first operating parameter and the second operating parameter to deviate from the theoretical relationship. Such factors may compromise the ability of a motion-control system to effectively drive the second operating parameter toward the target value with open-loop control of the first operating parameter.

U.S. Pat. No. 4,984,646 to Sano et al. ("the '646 patent") discloses a vehicle steering system that uses a closed-loop control method. The steering system of the '646 patent includes a steering motor connected to steerable road wheels, a steering wheel mechanically decoupled from the steerable road wheels, and a controller. The controller determines a target steering angle based on the angle of the steering wheel. The controller also determines an actual steering angle based on inputs from a speedometer and a yaw rate gyroscope. The controller subtracts the actual steering angle from the target steering angle to determine a steering error. The controller multiplies the steering error by a gain factor. The steering motor controls the angle of the steerable road wheels based on the value that results from the controller multiplying the steering error by the gain factor. The controller of the '646 patent determines the gain factor as a function of the speed of the vehicle. The '646 patent discloses that, for any particular speed of the vehicle, the controller holds the gain factor constant.

Although the '646 patent discloses a steering system that uses a closed-loop control method, certain disadvantages persist. For example, using a constant gain factor for any given speed of the vehicle may compromise performance of the steering system at one or more steering error values. If the steering system uses a relatively high gain factor, the steering motor may respond undesirably vigorously to relatively low steering errors. This may make it difficult for an operator to make fine steering adjustments. It may also cause the steering system to jerk when the control error goes from zero to a positive value or vice versa. Conversely, if the steering system uses a relatively low gain factor, the steering motor may respond undesirably sluggishly to relatively large steering errors.

The motion-control system and methods of the present disclosure solve one or more of the problems set forth above.

SUMMARY OF THE INVENTION

One disclosed embodiment relates to a method of operating a motion-control system that includes an actuator and a moveable component driven by the actuator. The method may include providing input that indicates a target value of a parameter of the motion of at least one of the actuator and the moveable component with an operator-input device that is mechanically decoupled from the moveable component. The method may also include controlling the operation of the actuator at least in part with a control signal, including generating the control signal at least in part by determining a control gain based at least in part on a control error between the target value of the parameter and an actual value of the parameter. Generating the control signal may also include multiplying the control gain by the control error or a value derived from the control error.

Another embodiment relates to a steering system for a mobile machine. The steering system may include one or more steering devices that apply steering forces to the environment surrounding the mobile machine to steer the mobile machine. The steering system may also include an operator-input device that is mechanically decoupled from the one or more steering devices. Additionally, the steering system may include controls that regulate how the one or more steering devices steer the mobile machine at least in part by generating a control signal that controls one or more aspects of the operation of the steering system. The controls may generate the control signal at least in part by determining a control gain based at least in part on a control error between a target value of and an actual value of a parameter related to the trajectory of the mobile machine and multiplying the control gain by the control error or a value derived from the control error.

A further embodiment relates to a motion-control system. The motion-control system may include an actuator and a moveable component driven by the actuator. The motion-control system may also include controls that regulate one or more aspects of the operation of the actuator, including a first operating parameter. The controls may include an operator-input device that is mechanically decoupled from the moveable component and that provides input indicating a target value of a second operating parameter. The second operating parameter may be a parameter of the motion of at least one of the actuator and the moveable component. The controls may regulate the first operating parameter in a manner such that the value of the first operating parameter depends at least in part on a control error between the target value of the second operating parameter and an actual value of the second operating parameter, and such that the second derivative of the first operating parameter with respect to the control error has a nonzero value for at least one control error value.

DETAILED DESCRIPTION

Figure 1:
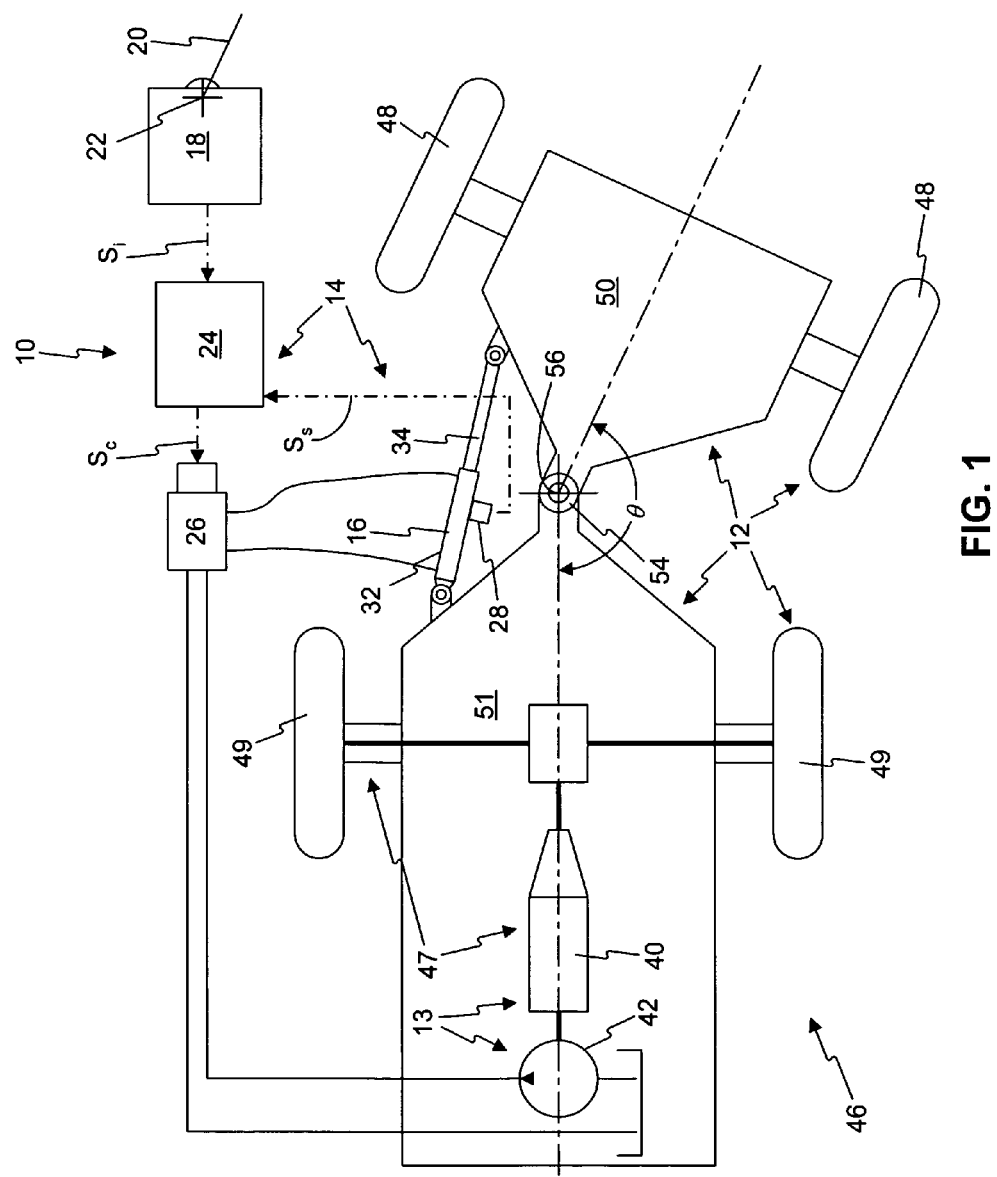
FIG. 1 is a schematic illustration of one embodiment of a motion-control system according to the present disclosure implemented as a steering system of a mobile machine.

FIG. 1 illustrates a motion-control system 10 according to the present disclosure. Motion-control system 10 may include moveable components 12, a power source 13 for providing power to move moveable components 12, and controls 14 for controlling the motion of moveable components 12.

Dependent in part on the purpose that motion-control system 10 serves, moveable components 12 may include various numbers and types of components. In some embodiments, such as the example provided in FIG. 1, motion-control system 10 may be a steering system for a mobile machine 46 with a propulsion system 47. Accordingly, moveable components 12 may include steering devices 48, 49 that transmit steering forces to the environment surrounding mobile machine 46 to steer mobile machine 46. As FIG. 1 shows, in some embodiments, steering devices 48, 49 may be wheels. Moveable components 12 may also include components that connect to steering devices 48, 49 and allow adjustment of a steering angle θ between steering devices 48 and steering devices 49. For example, moveable components 12 may include a frame section 50 that steering devices 48 mount to and a frame section 51 that steering devices 49 mount to. A pivot joint 54 between frame sections 50, 51 may allow adjustment of steering angle θ by allowing frame sections 50, 51 to pivot relative to one another about an axis 56.

Power source 13 may include any component or components that provide power for moving moveable components 12. Power source 13 may provide power in various ways, such as, for example, by supplying pressurized hydraulic fluid, supplying pressurized air, and/or supplying electricity. As FIG. 1 shows, in some embodiments, power source 13 may include an engine 40 of propulsion system 47 and a hydraulic pump 42 drivingly connected to engine 40.

Controls 14 may include an actuator 16, an operator-input device 18, provisions for gathering information about the motion of moveable components 12 and/or actuator 16, and provisions for controlling actuator 16. Actuator 16 may be a linear actuator, a rotary actuator, or a type of actuator that generates motion other than purely rotational or linear motion. Additionally, actuator 16 may be, for example, a hydraulic actuator, a pneumatic actuator, or an electrical actuator. As FIG. 1 shows, in some embodiments, actuator 16 may be a hydraulic cylinder with a housing 32 and a drive member 34.

Actuator 16 may be drivingly connected to moveable components 12. For example, as FIG. 1 shows, actuator 16 may be directly drivingly connected to each frame section 50, 51 and, through each frame section 50, 51, indirectly drivingly connected to steering devices 48, 49. This may allow actuator 16 to drive frame sections 50, 51 and steering devices 48, 49. As FIG. 1 shows, in some embodiments, actuator 16 may connect to frame sections 50, 51 in a manner that enables actuator 16 to adjust steering angle θ by pivoting frame section 50 and steering devices 48 about axis 56 relative to frame section 51 and steering devices 49.

Operator-input device 18 may include any component or components that provide input to other components of motion-control system 10 in a manner that depends on how an operator interacts with operator-input device 18. As FIG. 1 shows, operator-input device 18 may be mechanically decoupled from moveable components 12. In some embodiments, operator-input device 18 may provide input to one or more other components of controls 14 by generating an input signal $S_i$. Operator-input device 18 may transmit input signal $S_i$ in various ways, including, but not limited to, electrically, optically, mechanically, magnetically, wirelessly, and/or with fluid pressure.

In some embodiments, operator-input device 18 may include a handle 20 and one or more components that generate input signal S1 based at least in part on movement of handle 20. Handle 20 may be, for example, a joystick. The configuration of operator-input device 18 may allow handle 20 to move in various manners. In some embodiments, handle 20 may pivot about an axis 22. Handle 20 may have a limited range of motion. For example, in some embodiments, handle 20 may be able to pivot through less than 180 degrees about axis 22.

The provisions of controls 14 for gathering information about the motion of actuator 16 and/or the motion of moveable components 12 may include one or more sensors. For example, controls 14 may include a sensor 28 that provides controller 24 with a sensor signal $S_s$ relating to the actual value of one or more parameters of the motion of actuator 16 and moveable components 12. For example, sensor signal $S_s$ from sensor 28 may indicate the position of drive member 34 of actuator 16. In the embodiment shown in FIG. 1, by indicating the position of drive member 34 of actuator 16, sensor signal $S_s$ may also indicate steering angle θ and a turning radius of mobile machine 46. Sensor 28 may transmit signal $S_s$ in various ways, including, but not limited to, electrically, optically, mechanically, magnetically, wirelessly, and/or with fluid pressure.

The provisions for controlling actuator 16 may include provisions for generating a control signal $S_c$ for controlling one or more aspects of the operation of actuator 16. Control signal $S_c$ may transmit information in various ways, including, but not limited to, electrically, optically, mechanically, magnetically, wirelessly, and/or with fluid pressure. Controls 14 may, for example, include a controller 24 that generates control signal $S_c$. In some embodiments, controller 24 may generate control signals $S_c$ based at least in part on inputs from other components, such as input signal S1 from operator-input device 18 and sensor signal $S_s$ from sensor 28. Controller 24 may employ various algorithms for generating control signal $S_c$ to advance various objectives. The present disclosure provides details of some exemplary control algorithms that controller 24 may use to generate control signal $S_c$ below.

Control signal $S_c$ may control various aspects of the operation of actuator 16 through various means. For example, control signal $S_c$ may control the position, velocity, acceleration, and/or force output of actuator 16 by controlling a control component 26 that controls the supply of power from power source 13 to actuator 16. In some embodiments, control component 26 may be a valve that controls the flow of hydraulic fluid from hydraulic pump 42 to actuator 16 based on control signal $S_c$.

Motion-control system 10 is not limited to the configuration shown in FIG. 1. For example, control signal $S_c$ may control actuator 16 through means other than control component 26. In some embodiments, control signal $S_c$ may directly control one or more components of actuator 16 to control one or more aspects of the operation of actuator 16. Alternatively, in some embodiments, control signal $S_c$ may control one or more aspects of the operation of actuator 16 by controlling one or more aspects of the operation of power source 13. Furthermore, in some embodiments, controls 14 may use more than one control signal to control actuator 16.

Additionally, operator-input device 18 may have a different configuration than shown in FIG. 1 and discussed above. For example, handle 20 may have a different shape and/or move in different manners than discussed above. In some embodiments, in addition to, or in place of handle 20, operator-input device 18 may include other handles and/or other types of components that an operator can use to provide input, including, but not limited to, one or more of pedals, buttons, and touch screens.

Motion-control system 10 may also include components not shown in FIG. 1 and/or omit one or more of the components shown in FIG. 1. For example, motion-control system 10 may have a different number of moveable components 12 than FIG. 1 shows. In some embodiments, motion-control system 10 may include a single moveable component 12 drivingly connected to actuator 16. Additionally, motion-control system 10 may have provisions other than controller 24 for generating control signal $S_c$, such as, for example, a hard-wired control circuit. Motion-control system 10 may also have one or more additional actuators. In some embodiments, motion-control system 10 may include an additional actuator connected between frame sections 50, 51 like actuator 16 but on the opposite side of pivot joint 54. In such embodiments, controls 14 may, for example, control this additional actuator with a control signal equal and opposite control signal $S_c$ to operate the additional actuator in a manner equal and opposite actuator 16 so as to assist actuator 16 in adjusting steering angle θ.

Motion-control system 10 may also have different configurations of moveable components 12 for steering mobile machine 46. For example, motion-control system 10 may omit one or more of steering devices 48, 49 and/or include more steering devices than shown in FIG. 1. Additionally, rather than wheels, steering devices 48, 49 may be track units, skis, or other types of devices configured to apply steering forces to the ground to steer mobile machine 46. Furthermore, motion-control system 10 may be a different type of steering system than FIG. 1 shows, such as an Ackerman type steering system or a skid-steer type steering system. Additionally, in some embodiments, mobile machine 46 may be a watercraft or an aircraft, and steering devices 48, 49 may be devices configured to apply steering forces to fluid surrounding mobile machine 46, such as rudders.

Motion-control system 10 may also be a type of system other than a steering system of a mobile machine, such as, for example, an excavating implement or a hoist. In such embodiments, motion-control system 10 may mount to a mobile machine, or motion-control system 10 may have a stationary base.

INDUSTRIAL APPLICABILITY

Motion-control system 10 may have application for any task that requires moving one or more components in a controlled manner. Controls 14 of motion-control system 10 may control the motion of moveable components 12 in various manners to advance various objectives.

In some embodiments, controls 14 may control the value of a first operating parameter of motion-control system 10 with control signal $S_c$ to achieve a target value of a second operating parameter of motion-control system 10. For example, controls 14 may control the value of an operating parameter of actuator 16 with control signal $S_c$ to achieve a target value of a parameter of the motion of actuator 16 and moveable components 12. In some embodiments, controls 14 may control the velocity of actuator 16 with control signals $S_c$ to achieve a target value of a parameter related to the trajectory of mobile machine 46, such as steering angle θ. In the embodiment shown in FIG. 1, steering angle θ corresponds to the turning radius of mobile machine 46, and the velocity of actuator 16 corresponds to the rate of change of the turning radius of mobile machine 46.

Figure 2:
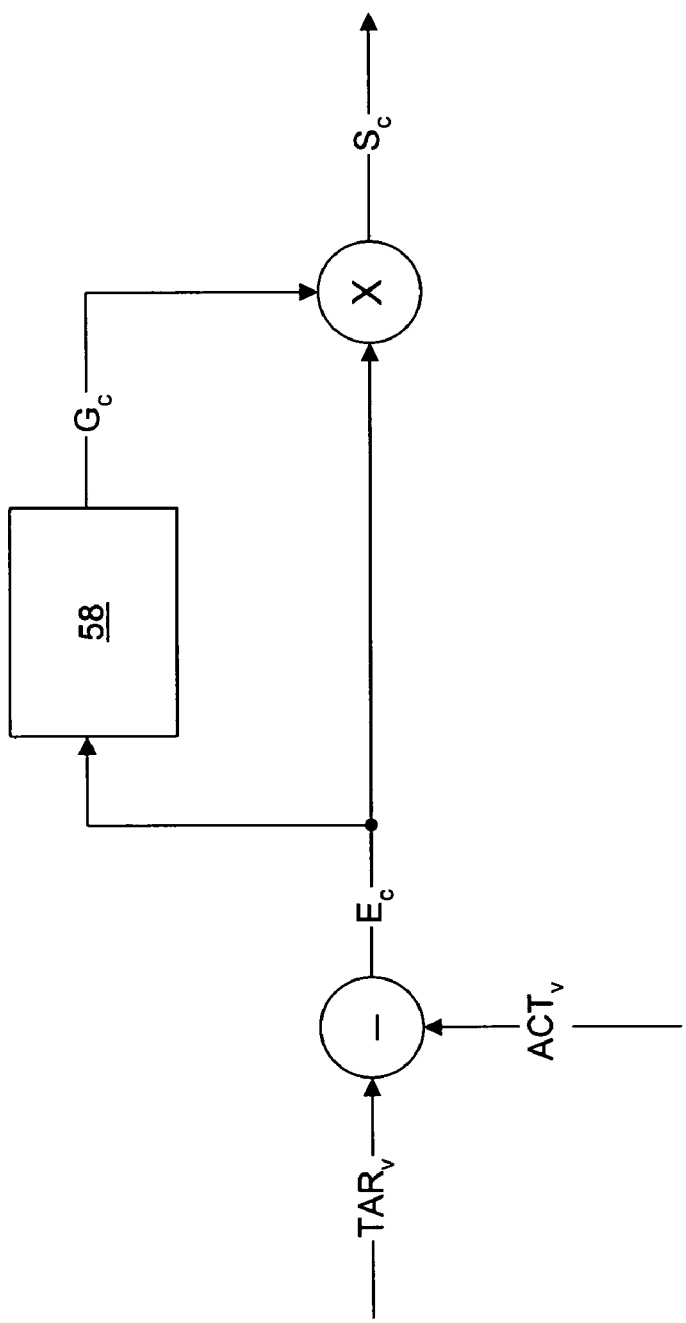
FIG. 2 is a block diagram of one embodiment of a method of generating a control signal according to the present disclosure.

Controls 14 may use various closed-loop control methods to control the velocity of actuator 16 with control signal $S_c$ to achieve a target value of steering angle θ. FIG. 2 provides an example of one closed-loop control method that controls 14 may use for this purpose. Such a control method may involve subtracting an actual value $ACT_v$ of steering angle θ from a target value $TAR_v$ of steering angle θ to generate a control error $E_c$. In a control operation 58, controls 14 may determine a control gain $G_c$ based at least in part on control error $E_c$. Controls 14 may multiply the resulting control gain $G_c$ by control error $E_c$ to generate control signal $S_c$. Generated in this manner, control signal $S_c$ may increase in magnitude as control error $E_c$ increases and, accordingly, increase the velocity of actuator 16 to more rapidly drive steering angle θ toward target value $TAR_v$ as control error $E_c$ increases.

To execute the control method shown in FIG. 2, controls 14 may use various means to determine the target value $TAR_v$ and the actual value $ACT_v$ of steering angle θ. In some embodiments, input signal S1 from operator-input device 18 may indicate the target value $TAR_v$ of steering angle θ. Additionally, in some embodiments, sensor signal $S_s$ from sensor 28 may indicate the actual value $ACT_v$ of steering angle θ.

Controls 14 may use various processes to determine control gain $G_c$ based on control error $E_c$ in control operation 58. For example, controls 14 may calculate control gain $G_c$ using an equation that defines control gain $G_c$ as a function of control error $E_c$, or controls 14 may determine control gain $G_c$ based on control error $E_c$ by using one or more lookup tables.

Figure 3A:
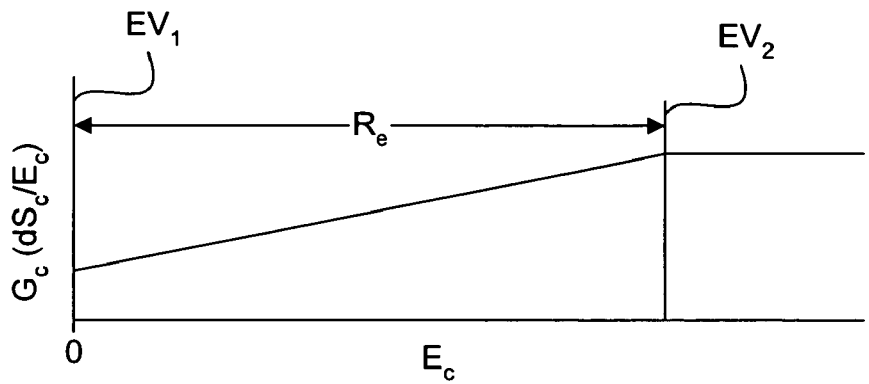
FIG. 3A is a graphical illustration of one manner according to the present disclosure of varying certain parameters of the operation of a motion-control system as a function of control error.
Figure 3B:
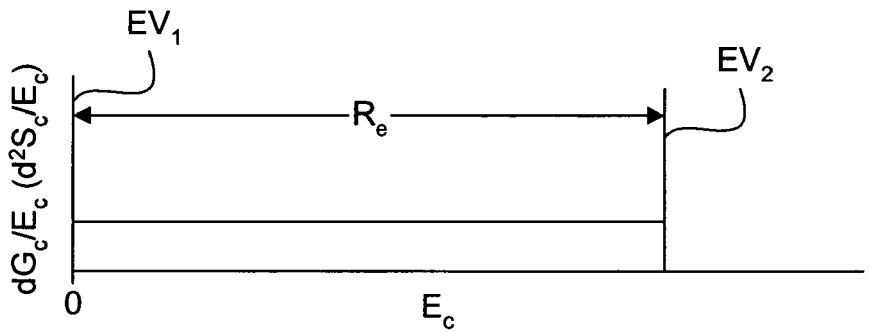
FIG. 3B is a graphical illustration of one manner according to the present disclosure of varying other parameters of the operation of a motion-control system as a function of control error.

Controls 14 may vary control gain $G_c$ in various ways as control error $E_c$ varies. FIG. 3A provides one example of how controls 14 may vary control gain $G_c$ dependent on control error $E_c$. FIG. 3B shows the derivative of control gain $G_c$ with respect to control error $E_c$ for the relationship between control gain $G_c$ and control error $E_c$ that FIG. 3A shows. In some embodiments, for at least some values of control error $E_c$, controls 14 may increase control gain $G_c$ as control error $E_c$ increases and, accordingly, the derivative of control gain $G_c$ with respect to control error $E_c$ may have a positive value at one or more control error values. For example, controls 14 may continuously increase control gain $G_c$ over a range $R_e$ that extends from a first control error value $EV_1$, such as zero, to a second control error value $EV_2$ higher than $EV_1$. In such a case, the derivative of control gain $G_c$ with respect to control error $E_c$ may remain positive over range $R_e$. Controls 14 may hold control gain $G_c$ constant and the derivative of control gain $G_c$ substantially equal to zero for control error values greater than $EV_2$.

Figure 3C:
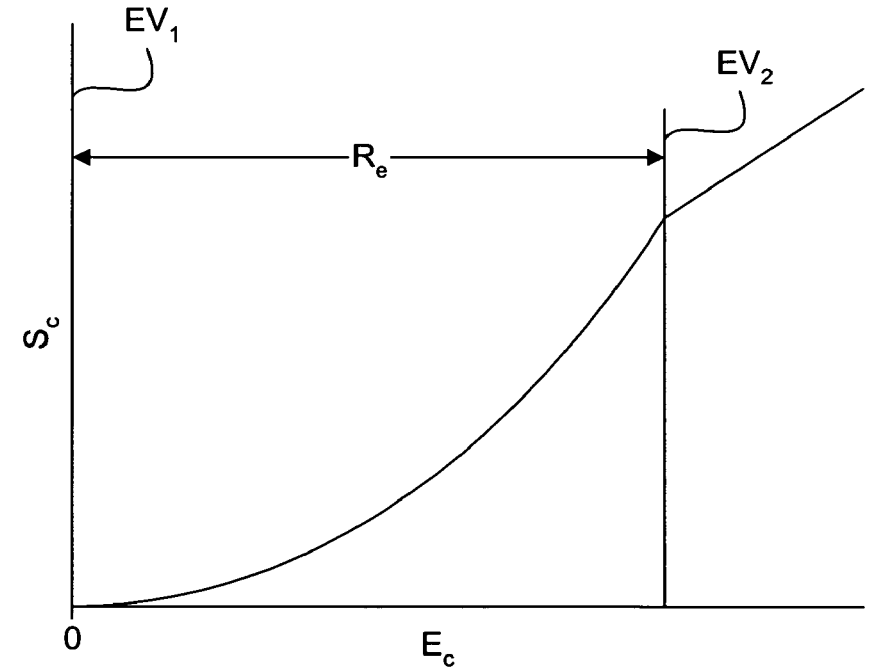
FIG. 3C is a graphical illustration of one manner according to the present disclosure of varying other parameters of the operation of a motion-control system as a function of control error.

Generating control signal $S_c$ by using the control method shown in FIG. 2 and varying control gain $G_c$ in the manner shown in FIG. 3A may provide the relationship between control error $E_c$ and control signal $S_c$ shown in FIG. 3C. Additionally, the control method shown in FIG. 2 makes control gain $G_c$ shown in FIG. 3A the derivative of control signal $S_c$ with respect to control error $E_c$. This also makes the derivative of control gain $G_c$ with respect to control error $E_c$ shown in FIG. 3B the second derivative of control error $S_c$ with respect to the control error $E_c$. As FIGS. 3B and 3C show, over range $R_e$, the second derivative of control signal $S_c$ with respect to control error $E_c$ may remain positive, and control signal $S_c$ may increase nonlinearly. At control error values above range $R_e$, the second derivative of control signal $S_c$ with respect to control error $E_c$ may remain substantially equal to zero, and control signal $S_c$ may increase linearly with increasing control error $E_c$.

Methods that controls 14 may use to generate control signal $S_c$ are not limited to the examples discussed above. For example, controls 14 may change control gain $G_c$ in a nonlinear manner as control error $E_c$ changes. Additionally, controls 14 may vary control gain $G_c$ over a different range of control error values than FIG. 3A shows. Furthermore, in some embodiments, controls 14 may vary control gain $G_c$ in different manners over different ranges of control error $E_c$.

Additionally, controls 14 may use additional or different variables to determine certain factors when generating control signal $S_c$. For example, in some embodiments, controls 14 may determine control gain $G_c$ based on other factors, such as the velocity of mobile machine 46, in addition to control error $E_c$. Similarly, controls 14 may determine target value $TAR_v$ of the second operating parameter based on other factors, such as one or more operating conditions of mobile machine 46, in addition to input signal $S_i$ from operator-input device 18. Alternatively, in some embodiments, controls 14 may determine the target value $TAR_v$ of the second parameter without operator input. For example, controls 14 may use a predetermined algorithm for determining $TAR_v$ based on one or more operating conditions of motion-control system 10.

Furthermore, in generating control signal $S_c$, controls 14 may perform various other operations, in addition to those shown in FIG. 2. For example, in some embodiments, controls 14 may perform one or more mathematical operations to tailor the value of control signal $S_c$ for the particular operating characteristics of one or more components of motion-control system 10. Similarly, in some embodiments, controls 14 may multiply control gain $G_c$ by a value derived from performing one or more mathematical operations on control error $E_c$, rather than multiplying control gain $G_c$ by control error $E_c$ itself. Furthermore, controls 14 may supplement the proportional control feedback shown in FIG. 2 with integral and/or derivative control feedback.

Figure 3D:
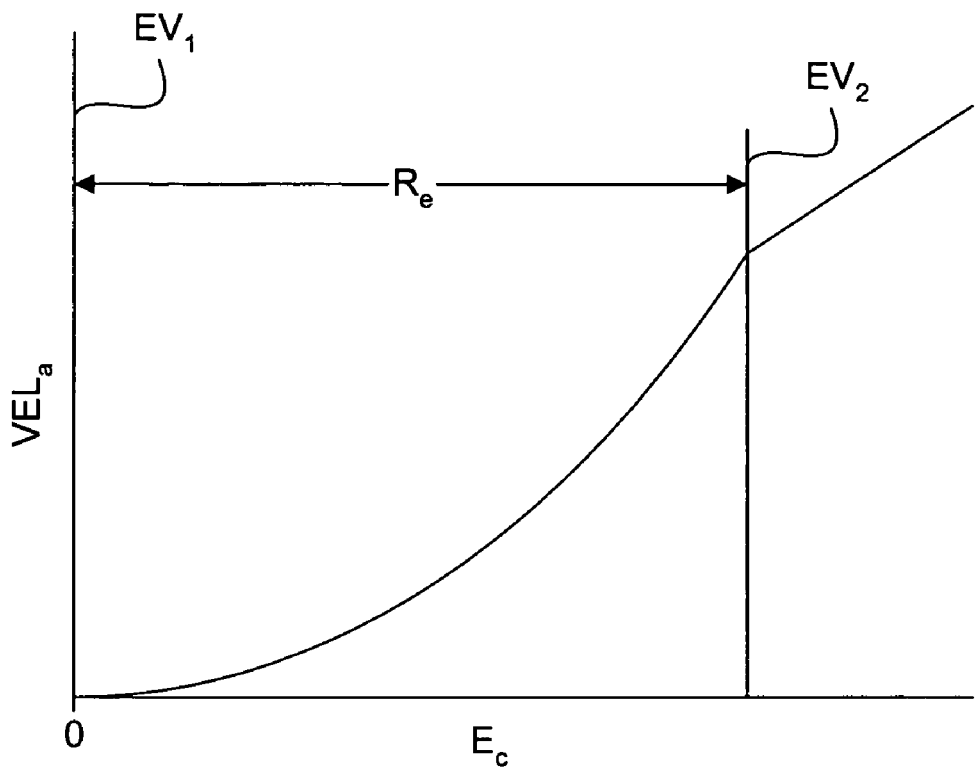
FIG. 3D is a graphical illustration of one manner according to the present disclosure of varying other parameters of the operation of a motion-control system as a function of control error.
Figure 3E:
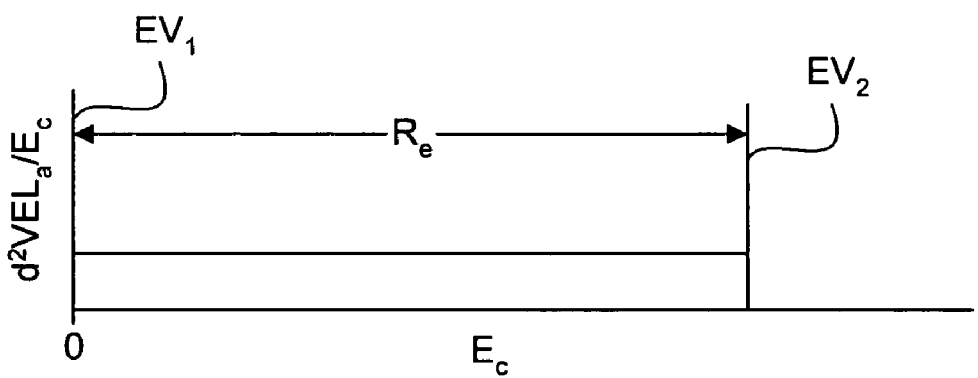
FIG. 3E is a graphical illustration of one manner according to the present disclosure of varying other parameters of the operation of a motion-control system as a function of control error.

Under the control of control signal $S_c$, the operation of actuator 16 may change in various manners as control error $E_c$ changes. FIG. 3D illustrates one manner in which the velocity $VEL_a$ of actuator 16 may vary as a function of control error $E_c$. FIG. 3E shows the second derivative of the velocity $VEL_a$ of actuator 16 with respect to control error $E_c$ for the relationship shown in FIG. 3D. In some embodiments, at one or more control error values, the second derivative of the velocity $VEL_a$ of actuator 16 with respect to control error $E_c$ may have a positive value, and the velocity $VEL_a$ of actuator 16 may increase nonlinearly. For example, the second derivative of the velocity $VEL_a$ of actuator 16 with respect to control error $E_c$ may remain positive over range $R_e$, and the velocity $VEL_a$ of actuator 16 may increase nonlinearly over range $R_e$. At control error values above range $R_e$, the second derivative of the velocity of actuator 16 with respect to control error $E_c$ may remain substantially equal to zero, and the velocity of actuator 16 may increase substantially linearly with increasing control error $E_c$.

Depending on the operating characteristics of various components of motion-control system 10, controls 14 may use different approaches to control the velocity $VEL_a$ of actuator 16 in the manner shown in FIG. 3D with control signal $S_c$. In some embodiments, the operating characteristics of the components controlled by control signal $S_c$ may provide a linear relationship between control signal $S_c$ and the velocity $VEL_a$ of actuator 16. In such embodiments, controls 14 may control the velocity $VEL_a$ of actuator 16 in the manner shown in FIG. 3D simply by using the control method shown in FIG. 2 and varying control gain $G_c$ in the manner shown in FIG. 3A. In other embodiments, the operating characteristics of the components controlled by control signal $S_c$ may provide a nonlinear relationship between control signal $S_c$ and the velocity $VEL_a$ of actuator 16. In such embodiments, controls 14 may use various measures to account for such nonlinearity and control the velocity $VEL_a$ of actuator 16 in the manner shown in FIG. 3D. For example, when generating control signal $S_c$, after multiplying control gain $G_c$ and control error $E_c$, controls 14 may perform various mathematical operations on the resulting value to adjust for nonlinear operating characteristics of the components that receive control signal $S_c$.

Methods that controls 14 may use to control the motion of moveable components 12 are not limited to the examples discussed above. Controls 14 may apply the methods discussed above to control a first operating parameter other than the velocity of actuator 16 and/or to achieve a target value of a second parameter other than steering angle θ. For example, controls 14 may use the control methods discussed above to control parameters such as the position, acceleration, force output, or torque output of actuator 16 to achieve a target value of a second operating parameter of motion-control system 10. Similarly, controls 14 may use the control methods described above to control a first operating parameter of motion-control system 10 for the purpose of achieving a target value of a different steering-related parameter, or a parameter unrelated to steering, such as, for example, a parameter related to the operation of an excavating implement or a hoist.

Additionally, the methods that controls 14 use to control the first operating parameter to achieve a target value of the second operating parameter may differ from the examples provided above in various ways. For example, controls 14 may control the relationship between the value of the first operating parameter and control error $E_c$ differently than FIG. 3D shows. Additionally, controls 14 may control the first operating parameter in a manner that depends on $E_c$ without actually subtracting $ACT_v$ from $TAR_v$ to determine the value of $E_c$. For example, controls 14 may generate control signal $S_c$ by using a lookup table that associates various combinations of $TAR_v$ and $ACT_v$ with different values of $S_c$.

The disclosed embodiments may provide various performance advantages. Certain performance advantages may accrue from making the derivative of control gain $G_c$ and the second derivative of the first operating parameter with respect to control error $E_c$ positive at one or more control error values so that the value of the first operating parameter increases nonlinearly at those control error values. Compared to increasing the first operating parameter linearly with increasing control error, increasing the first operating parameter nonlinearly with increasing control error may provide lower values of the first operating parameter at low control error values and/or higher values of the first operating parameter at high control error values. Low values of the first operating parameter at low control error values may facilitate accurately making fine adjustments in the position and/or motion of moveable components 12. Additionally, low values of the first operating parameter at low control error values may help motion-control system 10 smoothly begin and cease adjusting the value of the second operating parameter when control error $E_c$ initially deviates from zero and subsequently returns to zero. Furthermore, by providing high values of the first operating parameter at high control error values, controls 14 may help motion-control system 10 respond vigorously to large changes in the target value $TAR_v$ of the second operating parameter and/or large disturbances in the actual value $ACT_v$ of the second operating parameter.

These performance advantages may prove particularly beneficial in embodiments where input signal $S_i$ indicates the target value $TAR_v$ based on the position of handle 20 and handle 20 has a limited range of motion. In such embodiments, the limited range of motion of handle 20 may dictate that relatively small movements of handle 20 correspond to significant changes in the target value $TAR_v$ indicated by $S_i$. As a result, when trying to command a relatively small change in the position or motion of moveable components 12, an operator may inadvertently move handle 20 too far and cause operator-input device 18 to indicate a larger change in the target value $TAR_v$ than the operator actually desires. In such circumstances, low values of the first operating parameter at low values of control error $E_c$ may afford the operator time to move handle 20 back toward a position that corresponds with the value actually desired before motion-control system 10 overshoots.

Additionally, configuring controls 14 to generate control signal $S_c$ in the manner shown in FIG. 2 may make tuning controls 14 relatively simple and intuitive. This design allows a person tuning controls 14 to increase or decrease the responsiveness of controls 14 at any particular value of control error $E_c$ by simply increasing or decreasing the value of control gain $G_c$ that controls 14 use at that value of control error $E_c$.

It will be apparent to those skilled in the art that various modifications and variations can be made in the motion-control system and methods without departing from the scope of the disclosure. Other embodiments of the disclosed motion-control system and methods will be apparent to those skilled in the art from consideration of the specification and practice of the motion-control system and methods disclosed herein. It is intended that the specification and examples be considered as exemplary only, with a true scope of the disclosure being indicated by the following claims and their equivalents.

What is claimed is:

1. A method of operating a motion-control system that includes an actuator and a moveable component driven by the actuator, comprising:
   providing input that indicates a target value of a parameter of the motion of at least one of the actuator and the moveable component with an operator-input device that is mechanically decoupled from the moveable component; and
   controlling the operation of the actuator at least in part with a control signal, including generating the control signal at least in part by
      determining a control gain based at least in part on a control error between the target value of the parameter and an actual value of the parameter, and
      multiplying the control gain by the control error or a value derived from the control error.

2. The method of claim 1, wherein:
   the motion-control system is a steering system of a mobile machine; and
   the parameter relates to a trajectory of the mobile machine.

3. The method of claim 2, wherein determining the control gain based at least in part on the control error includes determining the control gain in a manner such that a derivative of the control gain with respect to the control error is positive for at least one control error value.

4. The method of claim 1, wherein the parameter corresponds to the position of at least one of the actuator and the moveable component.

5. The method of claim 4, wherein controlling the actuator at least in part with the control signal includes controlling the velocity of the actuator with the control signal.

6. The method of claim 1, wherein determining the control gain based at least in part on the control error includes determining the control gain in a manner such that a derivative of the control gain with respect to the control error is positive for at least one control error value.

7. The method of claim 1, wherein determining the control gain based at least in part on the control error includes determining the control gain in a manner such that a derivative of the control gain with respect to the control error is positive over at least one range of control error values.

8. A steering system for a mobile machine, comprising:
   one or more steering devices that apply steering forces to the environment surrounding the mobile machine to steer the mobile machine;
   an operator-input device that is mechanically decoupled from the one or more steering devices;
   controls that regulate how the one or more steering devices steer the mobile machine at least in part by generating a control signal that controls one or more aspects of the operation of the steering system, wherein the controls generate the control signal at least in part by
      determining a control gain based at least in part on a control error between a target value and an actual value of a parameter related to the trajectory of the mobile machine, and
      multiplying the control gain by the control error or a value derived from the control error.

9. The steering system of claim 8, wherein the controls determine the control gain in a manner such that a derivative of the control gain with respect to the control error is greater than zero for at least one control error value.

10. The steering system of claim 8, wherein the controls determine the control gain in a manner such that a derivative of the control gain with respect to the control error is greater than zero over at least one range of control error values.

11. The steering system of claim 8, wherein the parameter corresponds to a turning radius of the mobile machine.

12. The steering system of claim 11, wherein the control signal controls the rate of change of the turning radius of the mobile machine.

13. The steering system of claim 8, wherein:
   the operator-input device includes a handle that pivots through a range of less than 180 degrees;
   the operator-input device generates a signal corresponding to an angle of the handle; and
   the target value of the parameter is based at least in part on the signal generated by the operator-input device.

14. A motion-control system, comprising:
an actuator;
a moveable component driven by the actuator;
controls that regulate one or more aspects of the operation of the actuator, including a first operating parameter;
wherein the controls include an operator-input device that is mechanically decoupled from the moveable component and that provides input indicating a target value of a second operating parameter, the second operating parameter being a parameter of the motion of at least one of the actuator and the moveable component; and
wherein the controls regulate the first operating parameter in a manner such that a value of the first operating parameter depends at least in part on a control error between the target value of the second operating parameter and an actual value of the second operating parameter, and such that a second derivative of the first operating parameter with respect to the control error has a nonzero value for at least one control error value.

15. The motion-control system of claim 14, wherein the controls regulate the first operating parameter in a manner such that the second derivative of the first operating parameter with respect to the control error is greater than zero over at least one range of control error values.

16. The motion-control system of claim 14, wherein:
the motion-control system is a steering system for a mobile machine; and
the second operating parameter relates to the trajectory of the mobile machine.

17. The motion-control system of claim 14, wherein the controls regulate the first operating parameter in a manner such that the second derivative of the first operating parameter with respect to the control error is greater than zero over a range of control error values from zero to a second control error greater than zero.

18. The motion-control system of claim 14, wherein:
the motion-control system is a steering system for a mobile machine;
the first operating parameter is the velocity of the actuator; and
the second operating parameter relates to the trajectory of the mobile machine.

19. The motion-control system of claim 14, wherein:
the operator-input device includes a handle that is pivotal through a range of less than 180 degrees; and
the operator-input device indicates the target value of the second operating parameter by generating a signal based on the pivot angle of the handle.

20. The motion-control system of claim 14, wherein:
the controls regulate the first operating parameter at least in part with a control signal; and
the controls generate the control signal at least in part by determining the control error, determining a control gain based at least in part on the control error, and multiplying the control gain by the control error or a value derived from the control error.

* * * * *